United States Patent [19]

Novak

[11] 4,329,805
[45] May 18, 1982

[54] HUMANE ANIMAL TRAP

[75] Inventor: Milan Novak, Aurora, Canada

[73] Assignee: Her Majesty the Queen in Right of Ontario as represented by the Minister of Natural Resources, Toronto, Canada

[21] Appl. No.: 153,873

[22] Filed: May 28, 1980

[30] Foreign Application Priority Data

Nov. 13, 1979 [CA] Canada .................................. 339748

[51] Int. Cl.³ ............................................ A01M 23/34
[52] U.S. Cl. ............................................ 43/87; 43/96
[58] Field of Search .......................... 43/87, 86, 96, 85

[56] References Cited

U.S. PATENT DOCUMENTS

| | | | |
|---|---|---|---|
| 837,247 | 11/1906 | Nuttall | 43/96 X |
| 1,732,919 | 10/1929 | Thompson | 43/87 |
| 2,696,063 | 12/1954 | Hounsell | 43/87 |
| 3,060,623 | 10/1962 | Aldrich | 43/87 |
| 3,967,408 | 7/1976 | Alberg | 43/87 |
| 4,069,612 | 1/1978 | King | 43/87 |
| 4,250,653 | 2/1981 | Davis | 43/87 |

Primary Examiner—Jimmy C. Peters
Attorney, Agent, or Firm—Sim & McBurney

[57] ABSTRACT

There is provided an animal trap which is specific to a given range of animal weights. The trap has a frame, and a spring-arm pivotally mounted at one end to the frame and having at the other end apparatus for entraining a cable. The spring-arm can swing from a horizontal position to an upwardly extending position, and is spring-biased toward the latter. A trip lever can move between two positions, in one of which it retains the spring-arm in the horizontal position, and in the other of which it releases the spring-arm. An animal stepping on the trip lever can cause it to release the spring-arm. The cable is anchored at one end and has at the other end a loop adapted to be placed so as to surround the trip lever. Apparatus is provided for avoiding the springing of the trap by an animal lighter than the given range of animal weights for which the trap is specific, this apparatus including a spring urging the trip lever toward the position in which it retains the spring-arm horizontally. Further apparatus are provided for avoiding retention in the trap of an animal heavier than the given range, and this includes a connector in the cable which joins one portion of the cable to another portion, such that the connector is capable of releasing these portions from connection together upon the application of a sufficient force. This will allow a heavier animal to break free of the trap.

11 Claims, 6 Drawing Figures

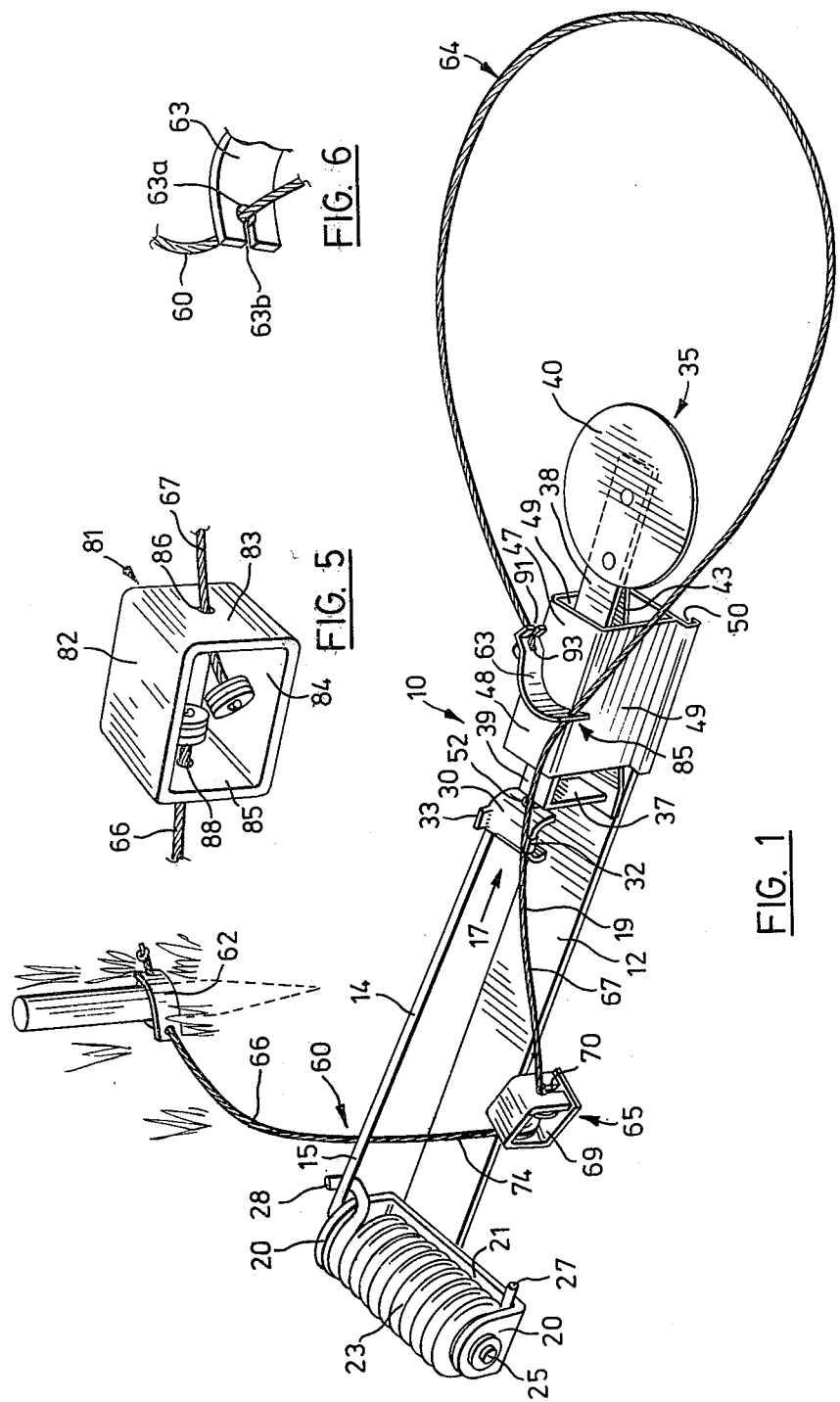

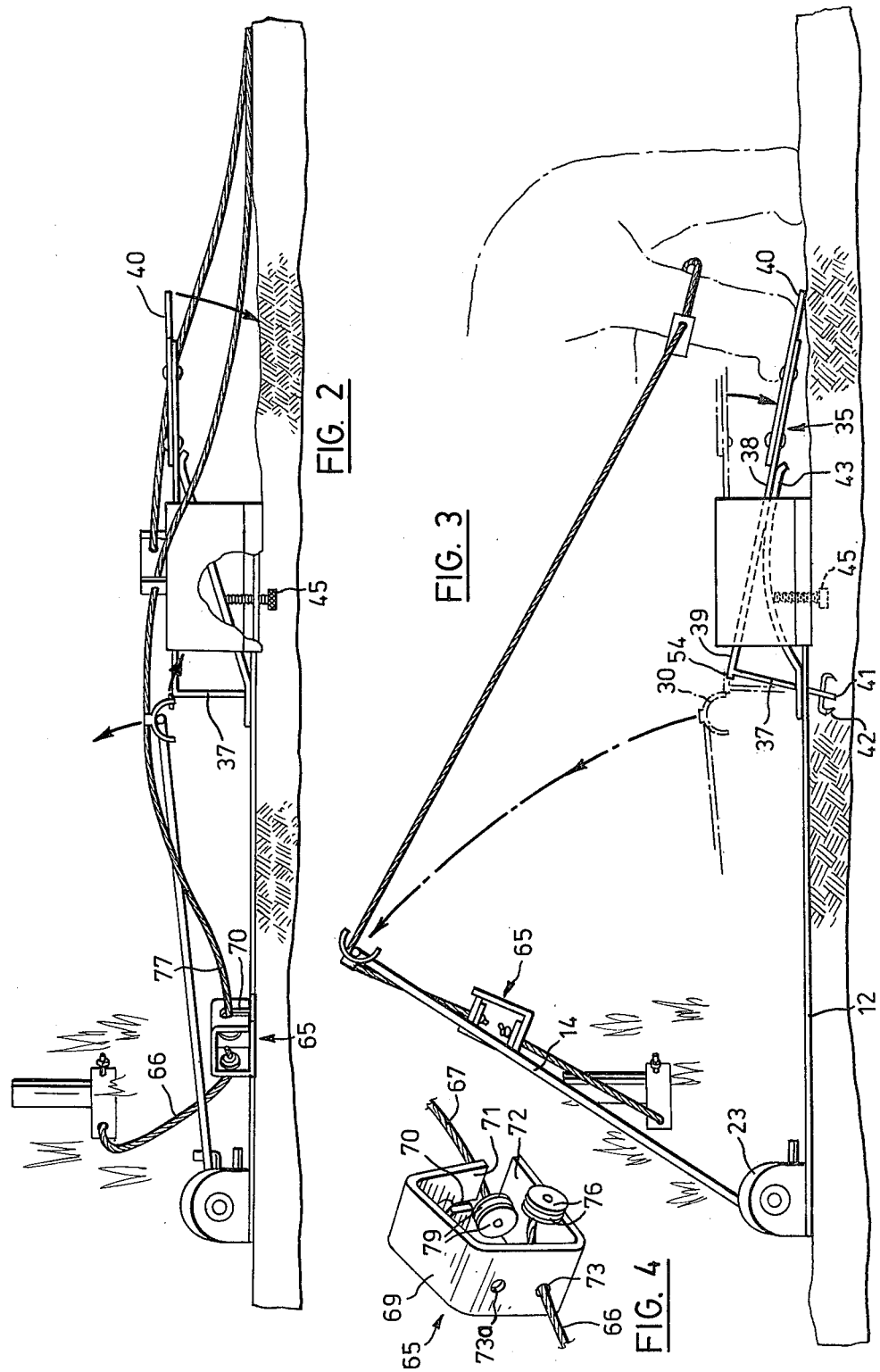

HUMANE ANIMAL TRAP

This invention relates generally to traps for animals, and has to do particularly with an animal trap designed to cause the minimum of discomfort to the animal.

Exemplary of the prior art in the area is U.S. Pat. No. 3,060,623, J. R. Aldrich, issued Oct. 30, 1962, and entitled "Animal Trap."

The Aldrich device includes two arms with a coil spring between the arms tending to bias them apart, with means at the non-spring end of one of the arms for supporting a trip lever, the lever having inter-engagement portions which retain the other of the spring arms downwardly against the first arm until the trip lever has been depressed, at which point the arms are disengaged from each other, and the one arm flies upwardly with respect to the other. A noose-like cable is positioned to surround the general location of the trip lever, and the cable is then entrained over a catch portion at the non-spring end of the upwardly snapping arm, the other end of the cable being anchored in some way, as to a tree. When the animal presses downwardly on the trip lever, the two arms are disengaged from each other, and spring apart. In so doing, the cable is suddenly jerked tight, and the noose tightens around the foot of the animal.

The basic construction of Aldrich is simple and reliable. The present invention makes use of the basic configuration shown by Aldrich, but includes additional structure representing an improvement over the capabilities of the Aldrich Animal Trap.

More specifically, it is an aspect of this invention to provide a humane animal trap which is such as to be specific to a given range of animal weights, such that an animal whose weight is either greater or smaller than the given specific range will either not succeed in springing the trap, or if it succeeds, will not be retained by the trap. In this way, needless entrapment of animals not aimed at by the trap is avoided.

Accordingly, this invention provides an animal trap specific to a given range of animal weights, the trap comprising:
a frame,
a spring-arm pivotally mounted at one end to the frame and having means at the other end for entraining a cable, the spring-arm being mounted for swinging movement in a substantially vertical plane between a first position in which it is substantially horizontal and a second position in which it extends upwardly,
spring means biasing the spring-arm toward said second position,
a trip lever adapted to move between an upper, set position in which the lever is adapted to cause the spring-arm to be retained in said first position against the urging of the spring means, and a lower, sprung position in which the spring-arm is released,
a cable having anchoring means at one end and defining at the other end a loop adapted to be placed so as to surround said trip lever,
means for avoiding the springing of the trap by an animal lighter than said given range of animal weights, comprising a spring urging the trip lever toward said upper, set position,
means for avoiding retention in the trap of an animal heavier than said given range of animal weights, comprising a connector in said cable and joining one portion of the cable to another portion thereof, the connector being capable of releasing said portions from connection together upon the application of a sufficient force.

One embodiment of this invention is illustrated in the accompanying drawings, in which like numerals denote like parts throughout the several views, and in which:

FIG. 1 is a perspective view of a trap built in accordance with this invention, the trap being in the "set" condition;

FIG. 2 is an elevational view of the trap of FIG. 1, partly broken away, also in the "set" condition;

FIG. 3 is a view similar to that of FIG. 2, showing the trap in the "sprung" condition; and FIG. 4 is a detail of a portion of the trap.

FIG. 5 is an alternative version of the portion shown in FIG. 4; and

FIG. 6 is a detail of a part of the loop seen in FIG. 1.

FIGS. 5 and 6 are on the same drawing sheet with FIG. 1.

Turning first to FIG. 1, an animal trap specific to a given range of animal weights is shown generally at 10, and includes a frame member 12, a spring arm 14 pivotally mounted at one end 15 to the frame member 12, and having means 17 at the other end for entraining a cable 19.

More specifically, the spring arm 14 is in the form of a relatively thick wire of which the end at 15 is bent into an L-configuration, and passed through suitable aligned apertures in opposite walls 20 of a bracket 21 which is welded or otherwise affixed to the leftward end of the frame member 12. A torque spring 23 of known construction encircles the leg of the "L" (not visible except for its extreme end 25), and has one of its ends 27 bearing downwardly against the bracket 21, and the other of its ends 28 hooked under and urging upwardly against the spring arm 14.

Thus, the frame member 12 and the spring arm 14 are constantly urged away from each other, and since the frame member 12 is intended to lie flatly against the ground, this will mean that the spring arm 14 is constantly urged upwardly in a counter-clockwise pivoting motion, as seen from the foreground in FIG. 1. Thus, the spring arm 14 is mounted for swinging movement in a substantially vertical plane between a first position (that of FIG. 1) in which it extends substantially horizontally and parallel to the frame member 12, and a second position in which the spring arm 14 extends at an angle upwardly, the angle depending upon the strength of the torque spring 23.

As can be seen in FIG. 1, the means 17 on the end of the spring arm for entraining the cable 19 includes a cylindrical portion 30 which is upwardly convex, and which defines the base of an upwardly-opening U-shaped "saddle" of which the sides are defined by two tabs 32 and 33. The spring arm 14 is bent and welded (or otherwise secured) under the cylindrical portion 30.

The animal trap further includes a trip lever 35 which is adapted to move between an upper, set position as shown in FIG. 1, in which the trip lever is able to retain the spring arm 14 in the first position of the latter against the urging of the torque spring 23, and a lower, sprung position (shown in solid lines in FIG. 3), in which the spring arm 14 is released.

More particularly, the trip lever 35 is L-shaped, having a vertical leg 37 and a horizontal leg 38. Thus, the trip lever extends upwardly as the leg 37 from a pivot location on the frame member 12 to an elbow 39, and then extends forwardly from the elbow 39 as the leg 38, to terminate in a pan element 40 which is wider than the trip lever itself, and is circular as shown.

The pivot at the lower end of the leg 37 consists of an extension 41 of the leg 37 (see FIG. 3) projecting downwardly through a suitably dimensioned transverse slot in the frame member 12, and having a pin 42 in an appropriate aperture, in order to retain the leg 37 in position with respect to the frame member 12. The extension 41 also projects through the leftward end of a spring element 43, which urges the trip lever 35 toward its upper position, i.e. that shown in FIGS. 1 and 2. More specifically, the spring element 43 is in the form of a "leaf spring," having at its leftward end a transverse slot through which the previously mentioned extension 41 of the leg 37 of the trip lever 35 can pass. The spring element 43 extends upwardly at an oblique angle to terminate at a position intermediate of the length of the leg 37 of the trip lever 35, and merely rests slidingly against the underside of the leg 38.

As can be seen particularly in FIG. 2, a manually adjustable thumb screw 45, threadedly engaged with a tapped bore in the frame member 12 at a position rightwardly or forwardly of the leg 37 of the trip lever 35, provides a fulcrum at an intermediate location of the upwardly obliquely sloping spring element 43, thus causing the latter to maintain a constant upward urging against the underside of the leg 38 of the trip lever 35. Adjustment of the thumb screw 45 will in turn adjust the amount of downward pressure that is required on the pan 40 in order to move the pan downwardly and spring the trap. Thus, if the trap were intended for animals of the size of a raccoon, an appropriate setting of the thumb screw 45 would avoid springing of the trap by chipmunks and other small animals.

As shown in FIG. 3, when an animal of the appropriate size and weight moves the pan 40 downwardly, the spring element 43 is forced to assume a greater curvature, due to the fulcrum function of the thumb screw 45.

As seen in the figures, a protective housing 47 partially covers the spring element 43, and protects the thumb screw 45 from dirt and the like. The housing 47 is in the form of a downwardly open, square configuration, U-shaped channel having a top wall 48 and two side walls 49. The bottom of each side wall 49 has a smaller, inwardly open channel 50 adapted to receive the opposite marginal edges of the frame member 12 in a frictional grip. Another purpose of the protective housing 47 is to ensure that the trap is not set off except when an animal treads on the pan 40.

Turning now to the means by which the trip lever is able to retain the spring arm 14 in its downward or "set" position shown in FIG. 1, this is seen to include an aperture 52 in the rightward face of the cylindrical portion 30 on the rightward end of the spring arm 14, and a projection 54 extending leftwardly or rearwardly from the elbow 39 of the trip lever 35, the projection 54 being adapted to engage the aperture 52 when the spring arm 14 is in the lowermost position shown in FIGS. 1 and 2, thus retaining the spring arm 14 in this position. It will be appreciated, particularly from an examination of FIG. 3, that downward pressure on the pan 40, thus causing the trip lever 35 to rotate in the clockwise sense about the pivot defined by the extension 41 will cause the trip lever 35 to move from the broken-line position to the solid-line position in FIG. 3, thus withdrawing the projection 54 from the aperture 52 in the cylindrical portion 30, thus in turn releasing the spring arm 14 to be snapped upwardly in the counter-clockwise direction due to the influence of the torque spring 23.

As seen in the figures, a cable generally shown at 60 is provided, the cable having anchoring means 62 at one end, and having a slide member 63 at the other end, the slide member being engaged with an intermediate location of the cable 60 itself, thus defining a loop or noose 64 adapted to be placed as shown in FIG. 1, in which the noose 64 surrounds the trip lever 35, specifically the pan 40 of the trip lever 35. As seen in FIG. 6, the slide member 63 has an aperture 63a, and a slot 63b extending from the aperture 63a to the end of the slide member 63. This provides one of two possible safety arrangements for ensuring that an animal larger than the size aimed at by the trap will not be caught in the trap, but will be able to break free. By exerting a sufficient pull on the loop, an animal of sufficient size will cause the cable 64 to be pulled out through the slot 63b, thus distorting the metal of the slide member 63 in doing so.

A second safety provision consists in a connector 65, which is provided at an intermediate location on the cable 64, and in fact joins two separate lengths 66 and 67, which together make up the full cable 60. The connector 65 is designed in such a way as to allow the two cable lengths 66 and 67 to come apart and separate from one another, upon the application of a sufficient tensional force between the two cable lengths 66 and 67.

More specifically, as can be seen by comparing FIGS. 1, 2 and 4, the connector 65 is a metal bar element 69 which is bent to define a closed loop of substantially rectangular configuration. The bar element 69 has a slot 70 at one of its ends 71, which slot 70 is closed by the other end 72 of the bar element 69, in its normal closed configuration, being that shown in FIGS. 1, 2 and 3. The bar element has two apertures at a location opposite the slot 70, these being identified by the numerals 73 and 73a in FIG. 4. Thus the slot 70 and the apertures 73 and 73a are located in opposite sides of the "rectangle" defined by the bar when it is in a closed loop configuration. The end of the cable length 66 passes through one of the apertures 73 or 73a and is attached to the inside of the loop to knuckle means incapable of passing through the aperture. In the figures, the knuckle means is seen to include two washers 76. The end of the cable, after passing through the washers, may be knotted, welded, or in any other manner may be incapable of passing through the washers. The end 77 of the other length 67 of cable passes through the slot 70 and is attached on the inside of the loop to knuckle means incapable of passing through the slot 70. In the figures, the last-mentioned knuckle means also includes washers 79, and again the end of the cable itself which projects through the washers 79 is made incapable of passing through the washers 79 by knotting, welding or other suitable means. The loop defined by the bar 69 is capable of being opened out to the configuration of FIG. 4, upon the application of sufficient tensile force between the cable lengths, and this ultimately will permit the cable length 67 to slide out free of the connector, through the open end of the slot 70. In FIG. 4, the cable length 67 is shown after having slid free of the connector, and the cable length 66 is illustrated as passing through the lower aperture 73. The choice of aperture in the case of the item shown in FIG. 4 will have a bearing upon the amount of tensile force which must be exerted in order to open the loop defined by the bar 69 into the configuration of FIG. 4.

An alternative component to replace component 65 shown in FIG. 4 is that shown in FIG. 5. In FIG. 5, a component 81 is seen to be shaped as a hollow, open ended rectangular closed loop having four interconnected sides 82–85, with apertures 86 and 88 in two opposed sides 83 and 85, respectively. Through these apertures 86 and 88 extend the cables 67 and 66, respectively, and the inside free ends of these cables are secured to washers in the same manner as previously described with respect to FIG. 4. By replacing the item of FIG. 4 with that shown in FIG. 5, only the swivel capability is retained (i.e. the swivelling of one cable with respect to the other), and the release of the cables from connection with each other upon sufficient tensile strength does not take place. However, by providing the release safety feature already described with respect to FIG. 6, it is still possible to ensure than an animal larger than that aimed at by the trap will not be retained by it.

As seen in FIG. 1, the slide member 63 is curved, and has, at the end opposite that shown in FIG. 6, a slot 91 into which the end of the cable 64 can be snagged. The slide member 63 also has an opening 93 adjacent the slot 91, through which the free end of the cable can be inserted, and then either tied into a knot, welded, soldered or in some other manner rendered incapable of passing back through the opening 93.

By making the cable 64 of a resilient "springy" material (i.e. one which resists bending or looping), the slide member 63 will have a tendency to "snap" around the leg of the trapped animal when the length of cable 64 between the two ends of the slide member 63 is short enough. By having the end of the cable 64 snagged in the slot 91 in such a way that it is retained in that position, there will come a point, as the loop 64 becomes smaller and smaller, when the resiliency of the cable 64 will cause the cable to suddenly release from the slot 91, and attempt to take up a substantially rectilinear configuration between the two ends of the slide member 63. This will cause the cable to press on one side of the animal's foot, while the slide member 63 surrounds the other side.

In regard to the connector 65 shown in FIG. 3, it will be appreciated that other constructions for this component may also be utilized. For example, instead of having the choice of hole location on the nearside as seen in FIG. 3, the choice could be provided on the end 71 of the bar element 69, by providing two or more slots 70 of different lengths, or by providing expanded circular portions at intervals along the length of a single slot 70. This would allow a choice of the tension required in order to cause the connector to release the ends of the cable from attachment to each other.

I claim:

1. An animal trap specific to a given range of animal weights, the trap comprising:
 a frame,
 a spring-arm pivotally mounted at one end to the frame and having means at the other end for entraining a cable, the spring-arm being mounted for swinging movement in a substantially vertical plane between a first position in which it is substantially horizontal and a second position in which it extends upwardly,
 spring means biasing the spring-arm toward said second position,
 a trip lever adapted to move between an upper, set position in which the lever is adapted to cause the spring-arm to be retained in said first position against the urging of the spring means, and a lower, sprung position in which the spring-arm is released,
 a cable having anchoring means at one end and defining at the other end a loop adapted to be placed so as to surround said trip lever,
 means for avoiding the springing of the trap by an animal lighter than said given range of animal weights, comprising a spring urging the trip lever toward said upper, set position,
 means for avoiding retention in the trap of an animal heavier than said given range of animal weights, comprising a connector in said cable and joining one portion of the cable to another portion thereof, the connector being capable of releasing said portions from connection together upon the application of a sufficient force.

2. The animal trap claimed in claim 1, in which said connector joins two separate cable lengths which together make up the full cable.

3. The animal trap claimed in claim 1, in which said connector joins the end of the cable to an intermediate location therein, thereby defining said loop.

4. The animal trap claimed in claim 3, including a further connector joining two separate cable lengths which together make up the full cable.

5. The animal trap claimed in claim 1, in which the force of the said spring urging the trip lever toward said upper, set position is manually adjustable.

6. The animal trap claimed in claim 1 or claim 5, in which the trip lever includes a cantilevered pan element on which an animal can step.

7. The animal trap claimed in claim 1, in which said trip lever is L-shaped, extending upwardly from a pivot location on the frame to an elbow, and then forwardly from said elbow to a pan element wider than the lever, such that downward movement of the pan element causes horizontal movement of the elbow, a portion of the spring-arm having an aperture, said elbow having a projection adapted to enter said aperture and retain the spring-arm in the first position thereof until the pan element is caused to move downwardly, whereupon the projection withdraws from said aperture to allow the spring-arm to swing toward its second position.

8. The animal trap claimed in claim 1, claim 5, or claim 7, in which the means on the spring-arm for entraining a cable includes a U-shaped portion opening upwardly, in which the cable can rest.

9. The animal trap claimed in claim 2, in which the said connector is a metal bar element bent to define a closed loop, the bar element having a slot at one of its ends, which slot is closed by the other end of the bar element, the bar element having an aperture at a location opposite the slot in terms of the closed loop, the end of one said cable length passing through said aperture and being attached on the inside of the loop to knuckle means incapable of passing through the aperture, the end of the other said cable length passing through said slot and being attached on the inside of the loop to other knuckle means incapable of passing through the slot, the loop being capable of being opened out, upon application of sufficient force between the cable lengths, to permit said other cable length to slide out free of the connector.

10. The animal trap claimed in claim 9, in which a further aperture is located opposite the slot in the closed loop, the two apertures being different distances away from said other end of the bar element as measured along the bar element, whereby to provide a choice of release tensile force for the connector.

11. The animal trap claimed in claim 1 or claim 3, in which a swivel means is interposed between two separate cable lengths and joins these to make up the full cable.

* * * * *